(12) United States Patent
Wei et al.

(10) Patent No.: US 11,428,605 B2
(45) Date of Patent: Aug. 30, 2022

(54) EXPERIMENTAL SYSTEM AND METHOD CAPABLE OF SIMULATING NON-INERTIAL SYSTEM OF GEAR TRANSMISSION

(71) Applicant: Chongqing University, Chongqing (CN)

(72) Inventors: Jing Wei, Chongqing (CN); Dong Jiang, Chongqing (CN); Aiqiang Zhang, Chongqing (CN)

(73) Assignee: Chongqing University, Chongqing (CN)

( * ) Notice: Subject to any disclaimer, the term of this patent is extended or adjusted under 35 U.S.C. 154(b) by 65 days.

(21) Appl. No.: 17/255,970

(22) PCT Filed: Oct. 12, 2020

(86) PCT No.: PCT/CN2020/120340
§ 371 (c)(1),
(2) Date: Dec. 23, 2020

(87) PCT Pub. No.: WO2021/068960
PCT Pub. Date: Apr. 15, 2021

(65) Prior Publication Data
US 2021/0190635 A1 Jun. 24, 2021

(30) Foreign Application Priority Data
Oct. 12, 2019 (CN) .......................... 201910966868.X (51) Int. Cl.
*G01M 13/025* (2019.01)
*G01M 13/021* (2019.01)
(52) U.S. Cl.
CPC ........ *G01M 13/025* (2013.01); *G01M 13/021* (2013.01)
(58) Field of Classification Search
CPC ........................... G01M 13/021; G01M 13/025
See application file for complete search history.

(56) References Cited

U.S. PATENT DOCUMENTS

| 4,159,642 A | * | 7/1979 | Hudson | G01M 13/025 73/115.02 |
| 4,520,659 A | * | 6/1985 | Lucia | G01M 13/025 73/116.04 |

(Continued)

FOREIGN PATENT DOCUMENTS

| CN | 103308313 | 9/2013 |
| CN | 106769015 | 5/2017 |

(Continued)

OTHER PUBLICATIONS

Shu et al., "Multi-Source Drive/Transmission System Electromechanical Coupling Modeling and Synchronization Characteristics Research", Abstract, Journal of Mechanical Engineering vol. 54, No. 7, Apr. 2018, China, pp. 63-73.

(Continued)

*Primary Examiner* — Eric S. McCall
(74) *Attorney, Agent, or Firm* — Wells St. John P.S.

(57) ABSTRACT

The present disclosure discloses an experimental system and method capable of simulating a non-inertial system of gear transmission, and relates to the field of aviation power transmission. The experimental system includes a gear transmission experiment table, a linear motion platform and an electric vibration table. The linear motion platform drives the gear transmission experiment table to perform horizontal linear acceleration motion to simulate a non-inertial system for linear acceleration of gear transmission. The electric vibration table drives the gear transmission experiment table to rotate back and forth around a horizontal shaft to simulate a non-inertial system for pitching of gear transmission. The electric vibration table drives the gear transmission experiment table to rotate back and forth around a vertical shaft to simulate a non-inertial system for yawing of gear transmission.

5 Claims, 4 Drawing Sheets

(56) References Cited

U.S. PATENT DOCUMENTS

| | | | | |
|---|---|---|---|---|
| 4,592,228 | A * | 6/1986 | Lucia | G01M 13/025 |
| | | | | 73/116.04 |
| 4,732,036 | A * | 3/1988 | Weeder | G01M 13/025 |
| | | | | 73/116.04 |
| 5,471,871 | A * | 12/1995 | Rogers | G01M 13/02 |
| | | | | 73/116.04 |
| 5,537,865 | A * | 7/1996 | Shultz | G01M 13/025 |
| | | | | 73/116.04 |
| 11,285,934 | B2 * | 3/2022 | Zhao | B60L 50/16 |
| 2008/0126889 | A1 * | 5/2008 | Barnes | G01M 13/026 |
| | | | | 714/704 |
| 2012/0252618 | A1 * | 10/2012 | Gutsche | G01M 13/026 |
| | | | | 474/150 |
| 2017/0227419 | A1 * | 8/2017 | Meron | G01M 13/022 |
| 2021/0146818 | A1 * | 5/2021 | Yakovlev | B60P 3/025 |

FOREIGN PATENT DOCUMENTS

| | | |
|---|---|---|
| CN | 110823562 | 2/2020 |
| KR | 10-1302671 | 9/2013 |
| WO | WO PCT/CN2020/120340 | 1/2021 |
| WO | WO POT/CN2020/120340 | 1/2021 |

OTHER PUBLICATIONS

Zhang et al., "Modeling and Dynamic Response of Parallel Shaft Gear Transmission in Non-Inertial System", Nonlinear Dynamics vol. 98, No. 2, Sep. 2019, Netherlands, pp. 997-1017.

* cited by examiner

EXPERIMENTAL SYSTEM AND METHOD CAPABLE OF SIMULATING NON-INERTIAL SYSTEM OF GEAR TRANSMISSION

RELATED PATENT DATA

This application is a 35 U.S.C. § 371 of and claims priority to PCT International Application Number PCT/CN2020/120340, which was filed 12 Oct. 2020 (12.10.2020), and which claims priority to CN Patent Application No. 201910966868.X, which was filed 12 Oct. 2019 (12.10.2019), the teachings of which are incorporated herein by reference.

TECHNICAL FIELD

The present disclosure relates to the field of aviation power transmission, in particular to an experimental system and method capable of simulating a non-inertial system of gear transmission.

BACKGROUND

In a non-inertial system, the gear transmission system is excited by complex additional loads, and its vibration characteristics will change, and even vibration instability will occur, which will threaten the stable operation of the aircraft.

Many scholars have done a lot of research on the dynamic characteristics of the gear transmission system during maneuvering flight and have achieved many results. However, the current experiment tables of gear transmission system do not consider the factors of the basic motion, and cannot simulate the motion state of the gear transmission system in the non-inertial system during flight.

In the technical field of aero-engines, the existing aero-engine experiment table with a dual-rotor system model for simulating the motion of the base uses multiple motors to drive different drive shafts to simulate pitching and yawing. However, it cannot provide impact and random excitations, and cannot simulate linear acceleration motion. The existing flexible rotor experiment table that simulates the angular motion of the base can provide multiple excitations through an electromagnetic vibration table, but it cannot simulate linear acceleration motion, either.

In order to carry out more realistic experimental research on the dynamic characteristics of gear transmission in a non-inertial system, it is necessary to design an experimental system and method capable of simulating the non-inertial system of gear transmission.

SUMMARY

An objective of the present disclosure is to provide an experimental system and method capable of effectively simulating a motion state of a gear transmission system during maneuvering flight of an aircraft and carrying out experimental research on dynamic characteristics of gear transmission in a non-inertial system of flight.

To achieve the above purpose, the present disclosure provides an experimental system capable of simulating a non-inertial system of gear transmission, including a gear transmission experiment table, a manual cross slide set, a linear motion platform and an electric vibration table.

The gear transmission experiment table includes a drive motor, a motor support I, couplings, a torque speed sensor I, an elastic shaft, a gear transmission system, a torque speed sensor II, a motor support II and a load motor.

The drive motor is mounted on the motor support I; the drive motor transmits power to the gear transmission system through two couplings, the torque speed sensor I and the elastic shaft.

The load motor is mounted on the motor support II; the load motor applies a load torque to the gear transmission system through two couplings and the torque speed sensor II; the gear transmission system is located between the drive motor and the load motor.

The manual cross slide set includes a manual cross slide I and a manual cross slide II; the motor support I and the torque speed sensor I are both fixed on the manual cross slide I; the torque speed sensor I acquires input and output vibration signals of the drive motor when the drive motor is running, and transmits the signals to a control system; the motor support II and the torque speed sensor II are both fixed on the manual cross slide II; the torque speed sensor II acquires input and output vibration signals of the load motor when the load motor is running, and transmits the signals to the control system.

There is a gap S between the manual cross slide I and the manual cross slide II, and the manual cross slide I and the manual cross slide II are both fixed on a support plate III; a lower end of the gear transmission system passes through the gap S and is fixed to the support plate III.

A lower surface of the support plate III is connected to the linear motion platform; the linear motion platform is provided thereon with a motion measurement system for measuring a position, a speed and an error of the linear motion platform, and the motion measurement system transmits a measurement result to the control system; a lower end of the linear motion platform is connected with a support plate II, and the support plate II is fixed on an upper surface of a support plate I.

The support plate I is a rectangular plate; an upper surface of the support plate I is provided with an acceleration sensor, and two ends of the support plate I are respectively marked as end A and end B; an upper surface of end A of the support plate I fixes the support plate II, and a lower surface of end A of the support plate I connects a vertical shaft; a lower end of the vertical shaft is connected with a horizontal shaft, and the horizontal shaft is fixed on a rotary table base.

Rotation axes of the drive motor, the load motor and the horizontal shaft are all parallel to a moving direction of the linear motion platform; a connecting line between end A and end B of the support plate I is perpendicular to the rotation axis of the horizontal shaft.

A lower surface of end B of the support plate I is provided with a connecting fixture, and the connecting fixture is a rigid connecting rod; a lower end of the connecting fixture is connected with the electric vibration table, and the electric vibration table is fixed on a vibration table base.

During operation, the electric vibration table drives the support plate I to rotate around the horizontal shaft through the connecting fixture, and the linear motion platform mounted on the support plate I and the gear transmission experiment table rotate together with the support plate I around the horizontal shaft.

An experimental system capable of simulating a non-inertial system of gear transmission includes a gear transmission experiment table, a manual cross slide set, a linear motion platform and an electric vibration table.

The gear transmission experiment table includes a drive motor, a motor support I, couplings, a torque speed sensor I, an elastic shaft, a gear transmission system, a torque speed sensor II, a motor support II and a load motor.

The drive motor is mounted on the motor support I; the drive motor transmits power to the gear transmission system through two couplings, the torque speed sensor I and the elastic shaft.

The load motor is mounted on the motor support II; the load motor applies a load torque to the gear transmission system through two couplings and the torque speed sensor II; the gear transmission system is located between the drive motor and the load motor.

The manual cross slide set includes a manual cross slide I and a manual cross slide II; the motor support I and the torque speed sensor I are both fixed on the manual cross slide I; the torque speed sensor I acquires input and output vibration signals of the drive motor when the drive motor is running, and transmits the signals to a control system; the motor support II and the torque speed sensor II are both fixed on the manual cross slide II; the torque speed sensor II acquires input and output vibration signals of the load motor when the load motor is running, and transmits the signals to the control system.

There is a gap S between the manual cross slide I and the manual cross slide II, and the manual cross slide I and the manual cross slide II are both fixed on a support plate III; a lower end of the gear transmission system passes through the gap S and is fixed to the support plate III.

A lower surface of the support plate III is connected to the linear motion platform; the linear motion platform is provided thereon with a motion measurement system for measuring a position, a speed and an error of the linear motion platform, and the motion measurement system transmits a measurement result to the control system; a lower end of the linear motion platform is connected with a support plate II, and the support plate II is fixed on an upper surface of a support plate I.

The support plate I is a rectangular plate; an upper surface of the support plate I is provided with an acceleration sensor, and two ends of the support plate I are respectively marked as end A and end B; an upper surface of end A of the support plate I fixes the support plate II, and a lower surface of end A of the support plate I connects a vertical shaft; a lower end of the vertical shaft is connected with a horizontal shaft, and the horizontal shaft is fixed on a rotary table base.

Rotation axes of the drive motor, the load motor and the horizontal shaft are all parallel to a moving direction of the linear motion platform; a connecting line between end A and end B of the support plate I is perpendicular to the rotation axis of the horizontal shaft.

A lower surface of end B of the support plate I is provided with a connecting fixture; the connecting fixture includes a push rod, springs, a cam, a wedge block and guides.

The push rod is an L-shaped rod; the push rod includes a support rod I and a support rod II that are vertically connected; a free end of the support rod I is connected to the lower surface of end B of the support plate I; the support rod II is parallel to the rotation axis of the horizontal shaft; a free end of the support rod II is connected with a baffle, and a surface of the baffle away from the support rod II is hinged with the cam.

The guides are respectively fixed above and below the support rod II, and the support rod II moves horizontally along the guides; the springs are respectively connected between the two guides and the baffle.

A contour edge of the cam is in contact with a wedge surface of the wedge block; a lower end of the wedge block is fixed on the electric vibration table, and the electric vibration table is fixed on a vibration table base.

During operation, the electric vibration table outputs a sinusoidal excitation in a vertical direction, and the wedge block moves up and down together with the electric vibration table; when the wedge block moves upward, the wedge block pushes the support plate I to rotate counterclockwise around the vertical shaft through the cam and the push rod, and the springs are gradually compressed; when the wedge block moves downward, the push rod and the baffle move in an opposite direction under the action of the springs, and at the same time pull the support plate I to rotate clockwise around the vertical shaft.

The linear motion platform mounted on the support plate I and the gear transmission experiment table rotate together with the support plate I around the vertical shaft.

Further, a transmission mode of the gear transmission system is parallel axis gear transmission or planetary gear transmission.

Further, the linear motion platform includes guide rails, a rotor part, a stator part, stoppers, a sliding carriage, a base and a motion measurement system; the base is a rectangular plate fixed on the support plate II, and a length direction of the base is the moving direction of the linear motion platform.

A side wall of the base along a length direction is provided thereon with a sensor bar of the motion measurement system, and an upper surface of the base is provided with two guide rails, the stator part and two stoppers; the stator part has a rectangular plate shape; the guide rails and the stator part are arranged along the length direction of the base; the stator part is located between the two guide rails; a height of the guide rail is smaller than a height of the stator part; the two stoppers are respectively located at two ends of the base.

The sliding carriage includes a sliding plate and four sliding rods under the sliding plate; an upper surface of the sliding plate is connected with the support plate III, and a lower surface thereof is provided with the rotor part; the rotor part is located directly above the stator part; lower ends of the four sliding rods are inserted into the two guide rails, so that the sliding carriage moves linearly along the guide rails on a horizontal plane.

A sensor of the motion measurement system is provided on a side wall of a sliding rod facing the sensor bar; when the sliding carriage moves, the sensor and the sensor bar of the motion measurement system sense each other to measure a position, a speed and an error of the sliding carriage.

An experimental method using the above experimental system to simulate a non-inertial system for linear acceleration of gear transmission includes the following steps:

1) connecting experimental equipment, and ensuring that all parts are connected firmly;

2) debugging a gear transmission experiment table and a linear motion platform, and ensuring that the gear transmission experiment table and the linear motion platform are able to operate normally;

3) starting a drive motor, and slowly increasing a speed of a gear transmission system to a speed required by an experiment; starting a load motor, and enabling the load motor to load the gear transmission system with a load torque required by the experiment;

4) accelerating the linear motion platform to an acceleration required by the experiment, and driving, by the linear motion platform, a support plate III and the gear transmission experiment table to make linear acceleration;

5) recording a dynamic response of the gear transmission system during the linear acceleration;

6) repeating steps 4) and 5), adjusting the acceleration of the linear motion platform through a control system, and recording the dynamic response of the gear transmission system under different non-inertial systems of linear acceleration under the same operating condition;

7) repeating steps 3), 4), 5) and 6), adjusting the speed of the drive motor, the load of the load motor and the acceleration of the linear motion platform through the control system, and recording the dynamic response of the gear transmission system under different non-inertial systems of linear acceleration under different operating conditions.

An experimental method using the above experimental system to simulate a non-inertial system for pitching of gear transmission includes the following steps:

1) connecting experimental equipment, and ensuring that all parts are connected firmly;

2) debugging a gear transmission experiment table and an electric vibration table, and ensuring that the gear transmission experiment table is able to operate normally and a support plate I rotates normally around a horizontal shaft;

3) starting a drive motor, and slowly increasing a speed of a gear transmission system to a speed required by an experiment; starting a load motor, and enabling the load motor to load the gear transmission system with a load torque required by the experiment;

4) starting the electric vibration table, controlling the electric vibration table to output an excitation required by the experiment, so that a linear motion platform mounted on the support plate I and the gear transmission experiment table rotate together with the support plate I around the horizontal shaft;

5) recording a dynamic response of the gear transmission system during the rotation of the support plate I;

6) repeating steps 4) and 5), adjusting the size and type of the excitation output by the electric vibration table through a control system, and recording the dynamic response of the gear transmission system under different non-inertial systems of pitching under the same operating condition; and 7) repeating steps 3), 4), 5) and 6), adjusting the speed of the drive motor, the load of the load motor and the size and type of the excitation output by the electric vibration table through the control system, and recording the dynamic response of the gear transmission system under different non-inertial systems of pitching under different operating conditions.

An experimental method using the above experimental system to simulate a non-inertial system for yawing of gear transmission includes the following steps:

1) connecting experimental equipment, and ensuring that all parts are connected firmly;

2) debugging a gear transmission experiment table and an electric vibration table, and ensuring that the gear transmission experiment table is able to operate normally and a support plate I rotates normally around a vertical shaft;

3) starting a drive motor, and slowly increasing a speed of a gear transmission system to a speed required by an experiment; starting a load motor, and enabling the load motor to load the gear transmission system with a load torque required by the experiment;

4) starting the electric vibration table, controlling the electric vibration table to output an excitation required by the experiment, so that a linear motion platform mounted on the support plate I and the gear transmission experiment table rotate together with the support plate I around the vertical shaft;

5) recording a dynamic response of the gear transmission system during the rotation;

6) repeating steps 4) and 5), adjusting the type and size of the excitation output by the electric vibration table through a control system, and recording the dynamic response of the gear transmission system under different non-inertial systems of yawing under the same operating condition; and 7) repeating steps 3), 4), 5) and 6), adjusting the speed of the drive motor, the load of the load motor and the size and type of the excitation output by the electric vibration table through the control system, and recording the dynamic response of the gear transmission system under different non-inertial systems of yawing under different operating conditions.

The technical effect of the present disclosure is beyond doubt. The system of the present disclosure truly simulates the operating conditions of the aircraft gear transmission system in linear acceleration, pitching and yawing, and realizes precise control of the motion attitude. The experimental system and method of the present disclosure can not only carry out the dynamic experiment of the gear transmission system with the base fixed, but also simulate the non-inertial excitation of the gear transmission system during maneuvering flight of the aircraft. The present disclosure fills in the blank of the experimental research in the field of aviation power transmission under the non-inertial system.

BRIEF DESCRIPTION OF DRAWINGS

In order to illustrate the technical solutions in the embodiments of the present disclosure or in the prior art, the accompanying drawings used in the embodiments are described briefly below. Apparently, the following accompanying drawings merely illustrate some embodiments of the present disclosure, and those of ordinary skill in the art may still derive other accompanying drawings based on these described accompanying drawing without any creative efforts.

Reference Numerals: 1. rotary table base; 2. horizontal shaft; 3. vertical shaft; 4. linear motion platform; 401. guide rail; 402. rotor part; 403. stator part; 404. stopper; 405. sliding carriage; 406. base; 407. sensor bar; 408. sensor; 5. manual cross slide set; 501. manual cross slide I; 502. manual cross slide II; 6. gear transmission experiment table; 601, drive motor; 602. motor support I; 603. coupling; 604. torque speed sensor I; 605. elastic shaft; 606. gear transmission system; 6061. bearing seat; 6062. driving wheel; 6063. bearing; 6064. driven wheel; 6065. gear ring; 6066. sun gear; 6067. planet carrier; 6068. planet gear; 607. torque speed sensor II; 608. motor support II; 609. load motor; 7. support plate III; 8. support plate II; 9. acceleration sensor; 10. support plate I; 11. connecting fixture; 1101. push rod; 1102. baffle; 1103. spring; 1104. cam; 1105. wedge block; 1106. guide; 12. electric vibration table; and 13. vibration table base.

DETAILED DESCRIPTION

The present disclosure is further described below with reference to the embodiments, but the scope of the subject matter of the present disclosure may not be construed as limiting to the following embodiments. Various substitutions and changes may be made based on common technical knowledge and conventional means in the art without departing from the technical idea of the present disclosure, but such substitutions and changes should all be included in the protection scope of the present disclosure.

Embodiment 1

This embodiment discloses an experimental system capable of simulating a non-inertial system of gear transmission. The experimental system includes a gear transmission experiment table 6, a manual cross slide set 5, a linear motion platform 4 and an electric vibration table 12.

Figure 2:
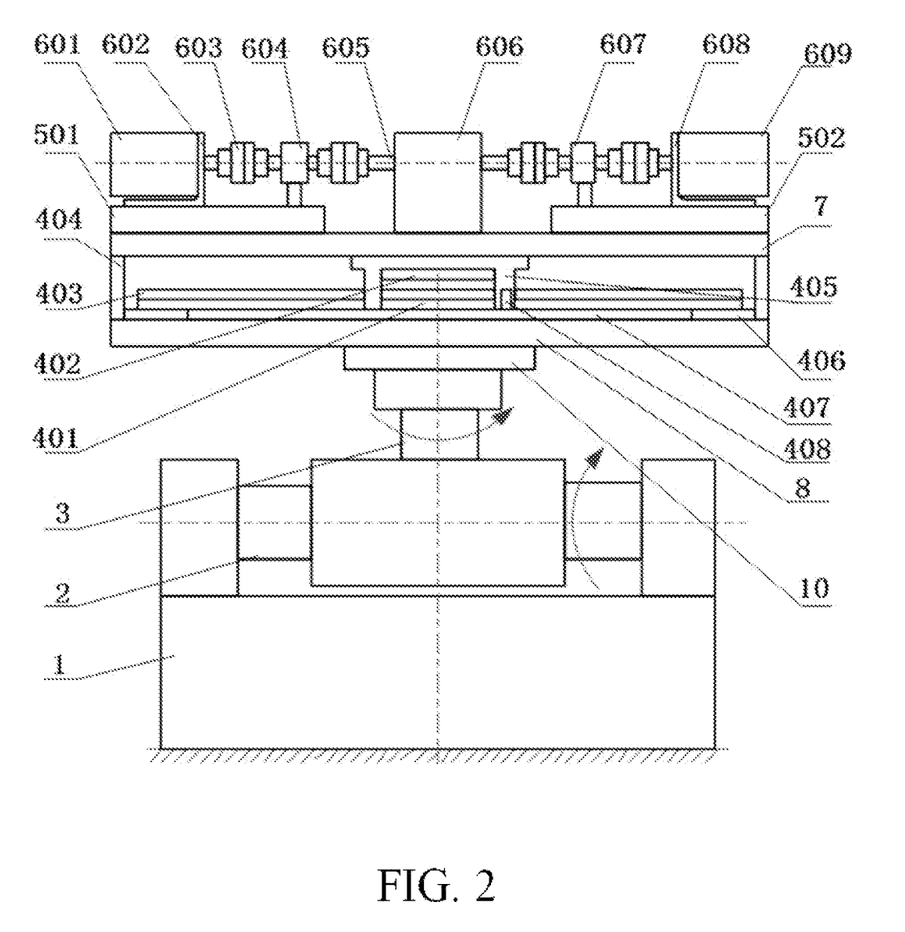
FIG. 2 is a left view of the system of the present disclosure.
Figure 3:
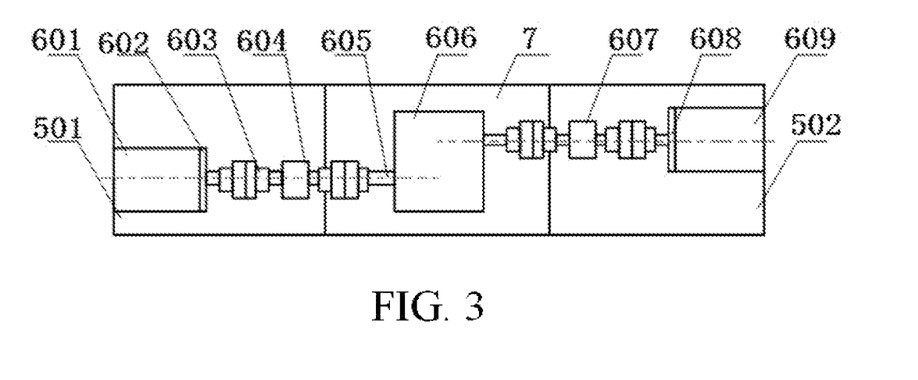
FIG. 3 is a top view of a gear transmission experiment table.

Referring to FIG. 2 or 3, the gear transmission experiment table 6 includes a drive motor 601, a motor support I 602, couplings 603, a torque speed sensor I 604, an elastic shaft 605, a gear transmission system 606, a torque speed sensor II 607, a motor support II 608 and a load motor 609.

The drive motor 601 is mounted on the motor support I 602. The drive motor 601 transmits power to the gear transmission system 606 through two couplings 603, the torque speed sensor I 604 and the elastic shaft 605.

The load motor 609 is mounted on the motor support II 608. The load motor 609 applies a load torque to the gear transmission system 606 through two couplings 603 and the torque speed sensor II 607. The gear transmission system 606 is located between the drive motor 601 and the load motor 609.

Figure 6:
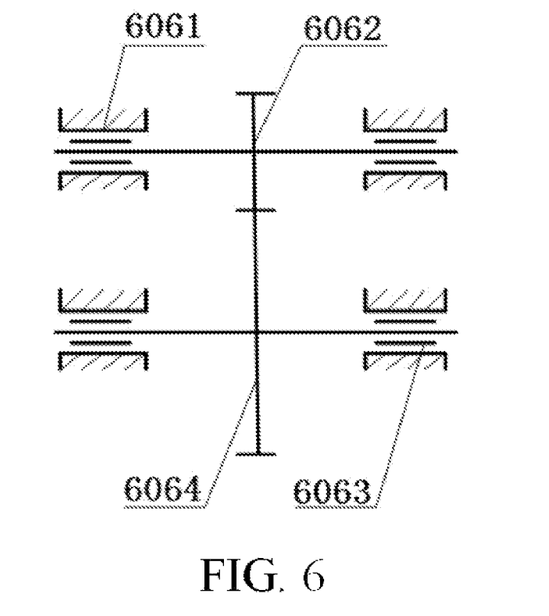
FIG. 6 is a schematic diagram of a parallel axis gear transmission system.

Referring to FIG. 6, in this embodiment, a transmission mode of the gear transmission system 606 is parallel axis gear transmission, and the gear transmission system 606 includes a bearing seat 6061, a driving wheel 6062, a bearing 6063 and a driven wheel 6064.

The manual cross slide set 5 includes a manual cross slide I 501 and a manual cross slide II 502. Referring to FIG. 2 or 3, the motor support I 602 and the torque speed sensor I 604 are both fixed on the manual cross slide I 501. The torque speed sensor I 604 acquires input and output vibration signals of the drive motor 601 when the drive motor is running, and transmits the signals to a control system. The motor support II 608 and the torque speed sensor II 607 are both fixed on the manual cross slide II 502. The torque speed sensor II 607 acquires input and output vibration signals of the load motor 609 when the load motor is running, and transmits the signals to the control system. The positions of the drive motor 601 and the load motor 609 are respectively adjusted by the manual cross slide I 501 and the manual cross slide II 502, so that the gear transmission system 606 is tested under different transmission ratios in accordance with the experimental requirements.

Referring to FIG. 2, there is a gap S between the manual cross slide I 501 and the manual cross slide II 502, and the manual cross slide I 501 and the manual cross slide II 502 are both fixed on a support plate III 7. A lower end of the gear transmission system 606 passes through the gap S and is fixed to the support plate III 7.

Figure 1:
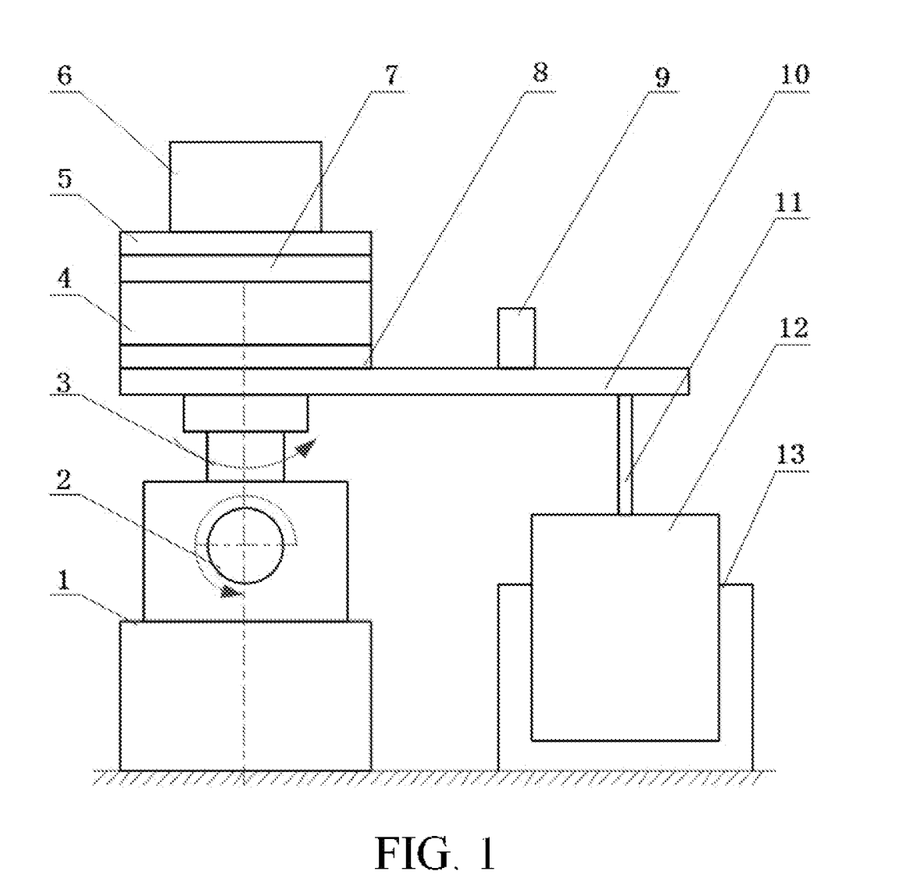
FIG. 1 is a front view of a system of the present disclosure.

Referring to FIG. 1, a lower surface of the support plate III 7 is connected to the linear motion platform 4. The linear motion platform 4 includes guide rails 401, a rotor part 402, a stator part 403, stoppers 404, a sliding carriage 405, a base 406 and a motion measurement system.

Referring to FIG. 2, the base 406 is a rectangular plate fixed on the support plate II 8, and a length direction of the base 406 is a moving direction of the linear motion platform 4.

Figure 4:
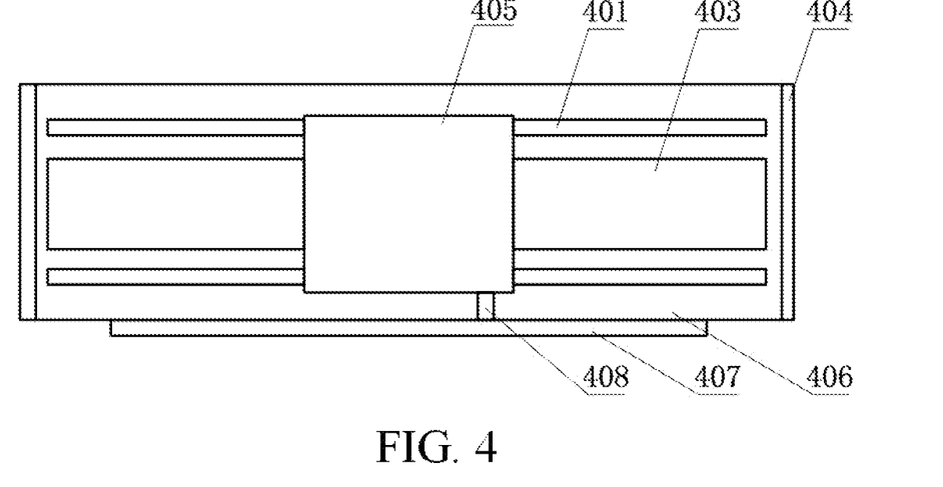
FIG. 4 is a top view of a linear motion platform.

Referring to FIG. 2 or 4, a side wall of the base 406 along a length direction is provided thereon with a sensor bar 407 of the motion measurement system, and an upper surface of the base 406 is provided with two guide rails 401, the stator part 403 and two stoppers 404. The stator part 403 has a rectangular plate shape. The guide rails 401 and the stator part 403 are arranged along the length direction of the base 406. The stator part 403 is located between the two guide rails 401. A height of the guide rail 401 is smaller than a height of the stator part 403. The two stoppers 404 are respectively located at two ends of the base 406, and the stoppers 404 are able to prevent the sliding carriage 405 from moving beyond the range and causing accidents.

The sliding carriage 405 includes a sliding plate and four sliding rods under the sliding plate. An upper surface of the sliding plate is connected with the support plate III 7, and a lower surface thereof is provided with the rotor part 402. The rotor part 402 is located directly above the stator part 403. Lower ends of the four sliding rods are inserted into the two guide rails 401, so that the sliding carriage 405 moves linearly along the guide rails 401 on a horizontal plane.

A sensor 408 of the motion measurement system is provided on a side wall of a sliding rod facing the sensor bar 407. When the sliding carriage 405 moves, the sensor 408 and the sensor bar 407 of the motion measurement system sense each other to measure a position, a speed and an error of the sliding carriage 405. The motion measurement system transmits a measurement result to the control system.

A lower end of the linear motion platform 4 is connected with the support plate II 8, and the support plate II 8 is fixed on an upper surface of a support plate I 10.

Referring to FIG. 1, the support plate I 10 is a rectangular plate. An acceleration sensor 9 is provided on an upper surface of the support plate I 10, and two ends of the support plate I 10 are respectively marked as end A and end B. An upper surface of end A of the support plate I 10 fixes the support plate II 8, and a lower surface of end A of the support plate I 10 connects a vertical shaft 3. A lower end of the vertical shaft 3 is connected with a horizontal shaft 2, and the horizontal shaft 2 is fixed on a rotary table base 1.

Referring to FIG. 2, rotation axes of the drive motor 601, the load motor 609 and the horizontal shaft 2 are all parallel to the moving direction of the linear motion platform 4. Referring to FIG. 1, a connecting line between end A and end B of the support plate I 10 is perpendicular to the rotation axis of the horizontal shaft 2.

Referring to FIG. 1, a lower surface of end B of the support plate I 10 is provided with a connecting fixture 11, and the connecting fixture 11 is a rigid connecting rod. A lower end of the connecting fixture 11 is connected with the electric vibration table 12, and the electric vibration table 12 is fixed on a vibration table base 13.

During operation, the electric vibration table 12 drives the support plate I 10 to rotate around the horizontal shaft 2 through the connecting fixture 11, and the linear motion platform 4 mounted on the support plate I 10 and the gear transmission experiment table 6 rotate together with the support plate I 10 around the horizontal shaft 2.

Embodiment 2

This embodiment discloses an experimental system capable of simulating a non-inertial system of gear transmission. The experimental system includes a gear transmission experiment table 6, a manual cross slide set 5, a linear motion platform 4 and an electric vibration table 12.

Referring to FIG. 2 or 3, the gear transmission experiment table 6 includes a drive motor 601, a motor support I 602, couplings 603, a torque speed sensor I 604, an elastic shaft 605, a gear transmission system 606, a torque speed sensor II 607, a motor support II 608 and a load motor 609.

The drive motor 601 is mounted on the motor support I 602. The drive motor 601 transmits power to the gear transmission system 606 through two couplings 603, the torque speed sensor I 604 and the elastic shaft 605.

The load motor 609 is mounted on the motor support II 608. The load motor 609 applies a load torque to the gear transmission system 606 through two couplings 603 and the torque speed sensor II 607. The gear transmission system 606 is located between the drive motor 601 and the load motor 609.

Figure 7:
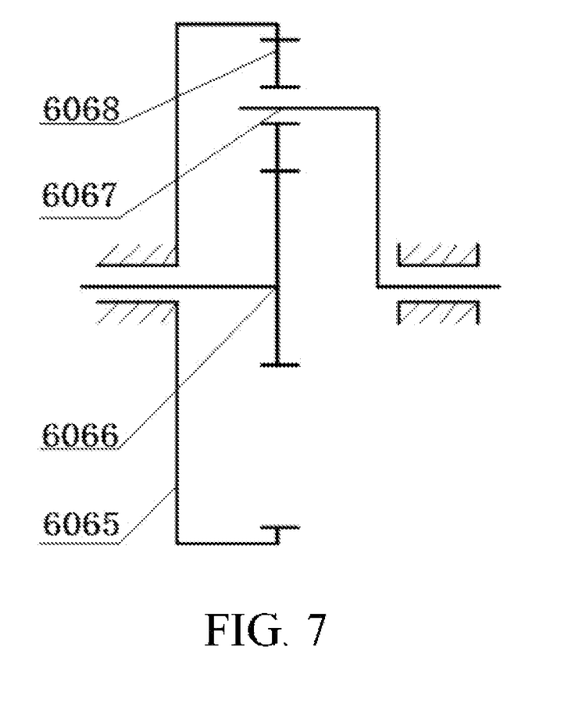
FIG. 7 is a schematic diagram of a planetary gear train gear transmission system.

Referring to FIG. 7, in this embodiment, a transmission mode of the gear transmission system 606 is planetary gear transmission, and the gear transmission system 606 includes a gear ring 6065, a sun gear 6066, a planet carrier 6067 and a planet gear 6068.

The manual cross slide set 5 includes a manual cross slide I 501 and a manual cross slide II 502. Referring to FIG. 2 or 3, the motor support I 602 and the torque speed sensor I 604 are both fixed on the manual cross slide I 501. The torque speed sensor I 604 acquires input and output vibration signals of the drive motor 601 when the drive motor is running, and transmits the signals to a control system. The motor support II 608 and the torque speed sensor II 607 are both fixed on the manual cross slide II 502. The torque speed sensor II 607 acquires input and output vibration signals of the load motor 609 when the load motor is running, and transmits the signals to the control system. The positions of the drive motor 601 and the load motor 609 are respectively adjusted by the manual cross slide I 501 and the manual cross slide II 502, so that the gear transmission system 606 is tested under different transmission ratios in accordance with the experimental requirements.

Referring to FIG. 2, there is a gap S between the manual cross slide I 501 and the manual cross slide II 502, and the manual cross slide I 501 and the manual cross slide II 502 are both fixed on a support plate III 7. A lower end of the gear transmission system 606 passes through the gap S and is fixed to the support plate III 7.

Referring to FIG. 1, a lower surface of the support plate III 7 is connected to the linear motion platform 4. The linear motion platform 4 includes guide rails 401, a rotor part 402, a stator part 403, stoppers 404, a sliding carriage 405, a base 406 and a motion measurement system.

Referring to FIG. 2, the base 406 is a rectangular plate fixed on the support plate II 8, and a length direction of the base 406 is a moving direction of the linear motion platform 4.

Referring to FIG. 2 or 4, a side wall of the base 406 along a length direction is provided thereon with a sensor bar 407 of the motion measurement system, and an upper surface of the base 406 is provided with two guide rails 401, the stator part 403 and two stoppers 404. The stator part 403 has a rectangular plate shape. The guide rails 401 and the stator part 403 are arranged along the length direction of the base 406. The stator part 403 is located between the two guide rails 401. A height of the guide rail 401 is smaller than a height of the stator part 403. The two stoppers 404 are respectively located at two ends of the base 406, and the stoppers 404 are able to prevent the sliding carriage 405 from moving beyond the range and causing accidents.

The sliding carriage 405 includes a sliding plate and four sliding rods under the sliding plate. An upper surface of the sliding plate is connected with the support plate III 7, and a lower surface thereof is provided with the rotor part 402. The rotor part 402 is located directly above the stator part 403. Lower ends of the four sliding rods are inserted into the two guide rails 401, so that the sliding carriage 405 moves linearly along the guide rails 401 on a horizontal plane.

A sensor 408 of the motion measurement system is provided on a side wall of a sliding rod facing the sensor bar 407. When the sliding carriage 405 moves, the sensor 408 and the sensor bar 407 of the motion measurement system sense each other to measure a position, a speed and an error of the sliding carriage 405. The motion measurement system transmits a measurement result to the control system.

A lower end of the linear motion platform 4 is connected with the support plate II 8, and the support plate II 8 is fixed on an upper surface of a support plate I 10.

Referring to FIG. 1, the support plate I 10 is a rectangular plate. An acceleration sensor 9 is provided on an upper surface of the support plate I 10, and two ends of the support plate I 10 are respectively marked as end A and end B. An upper surface of end A of the support plate I 10 fixes the support plate II 8, and a lower surface of end A of the support plate I 10 connects a vertical shaft 3. A lower end of the vertical shaft 3 is connected with a horizontal shaft 2, and the horizontal shaft 2 is fixed on a rotary table base 1.

Referring to FIG. 2, rotation axes of the drive motor 601, the load motor 609 and the horizontal shaft 2 are all parallel to the moving direction of the linear motion platform 4. Referring to FIG. 1, a connecting line between end A and end B of the support plate I 10 is perpendicular to the rotation axis of the horizontal shaft 2.

Figure 5:
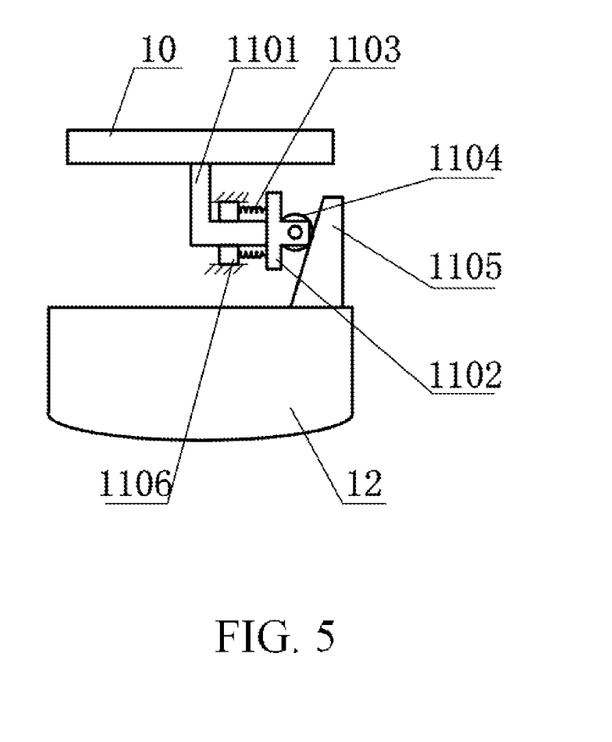
FIG. 5 is a left view of a connecting fixture in the simulation of a yawing motion.

Referring to FIG. 1, a lower surface of end B of the support plate I 10 is provided with a connecting fixture 11. Referring to FIG. 5, the connecting fixture 11 includes a push rod 1101, springs 1103, a cam 1104, a wedge block 1105 and guides 1106.

The push rod 1101 is an L-shaped rod. The push rod 1101 includes a support rod I and a support rod II that are vertically connected. A free end of the support rod I is connected to the lower surface of end B of the support plate I 10. The support rod II is parallel to the rotation axis of the horizontal shaft 2. A free end of the support rod II is connected with a baffle 1102, and a surface of the baffle 1102 away from the support rod II is hinged with the cam 1104.

Referring to FIG. 5, the guides 1106 are respectively fixed above and below the support rod II, and the support rod II moves horizontally along the guides 1106. The springs 1103 are respectively connected between the two guides 1106 and the baffle 1102.

A contour edge of the cam 1104 is in contact with a wedge surface of the wedge block 1105. A lower end of the wedge block 1105 is fixed on the electric vibration table 12, and the electric vibration table 12 is fixed on a vibration table base 13.

Referring to FIG. 1, during operation, the electric vibration table 12 outputs a sinusoidal excitation in a vertical direction, and the wedge block 1105 moves up and down together with the electric vibration table 12. When the wedge block 1105 moves upward, the wedge block 1105 pushes the support plate I 10 to rotate counterclockwise around the vertical shaft 3 through the cam 1104 and the push rod 1101, and the springs 1103 are compressed. When the wedge block 1105 moves downward, the push rod 1101 moves in an opposite direction under the action of the springs 1103, and at the same time pulls the support plate I 10 to rotate clockwise around the vertical shaft 3.

The linear motion platform 4 mounted on the support plate I 10 and the gear transmission experiment table 6 rotate together with the support plate I 10 around the vertical shaft 3.

Embodiment 3

An experimental method using the experimental system described in Embodiment 1 to simulate a non-inertial system for linear acceleration of gear transmission, including the following steps:

1) Connect experimental equipment, and ensure that all parts are connected firmly.

2) Debug a gear transmission experiment table 6, power on a drive motor 601, and control a speed of a gear transmission system 606 to slowly increase to a safe speed; power on a load motor 609, and control the gear transmission system 606 to be slowly loaded to a safe load torque; ensure that the gear transmission system 606 is able to rotate normally, and observe whether a signal output of a torque speed sensor I 604 and a torque speed sensor II 607 is normal.

3) Debug a linear motion platform 4, power on a stator part 403, and make an excitation magnetic field interact with a traveling wave magnetic field to generate an electromagnetic thrust; drive a rotor part 402 to accelerate by the electromagnetic thrust, and drive, by the rotor part 402, a sliding carriage 405 to accelerate to a safe acceleration along guide rails 401; ensure that the sliding carriage 405 is able to move normally and a signal output of a motion measurement system is normal.

4) Start the drive motor 601 to slowly increase the speed of the gear transmission system 606 to a speed required by an experiment; start the load motor 609, and enable the load motor 609 to load the gear transmission system 606 with a load torque required by the experiment.

5) Power on the stator part 403, control the sliding carriage 405 to accelerate along the guide rails 401 to an acceleration required by the experiment, and allow a support plate III 7 mounted on the sliding carriage 405 and the gear transmission experiment table 6 to make linear acceleration along with the sliding carriage 405.

6) Record a dynamic response of the gear transmission system 606 during the linear acceleration.

7) Repeat Steps 5) and 6), adjust the acceleration of the linear motion platform 4 through a control system, and record the dynamic response of the gear transmission system 606 under different non-inertial systems of linear acceleration under the same operating condition.

8) Repeat Steps 3), 4), 5) and 6), adjust the speed of the drive motor 601, the load of the load motor 609 and the acceleration of the linear motion platform 4 through the control system, and record the dynamic response of the gear transmission system 606 under different non-inertial systems of linear acceleration under different operating conditions.

9) Shut down in accordance with an operating procedure of the experimental equipment.

Embodiment 4

An experimental method using the experimental system described in Embodiment 1 to simulate a non-inertial system for pitching of gear transmission, including the following steps:

1) Connect experimental equipment, and ensure that all parts are connected firmly and a vibration test system is well connected.

2) Debug a gear transmission experiment table 6, power on a drive motor 601, and control a speed of a gear transmission system 606 to slowly increase to a safe speed; power on a load motor 609, and control the gear transmission system 606 to be slowly loaded to a safe load torque; ensure that the gear transmission system 606 is able to rotate normally, and observe whether a signal output of a torque speed sensor I 604 and a torque speed sensor II 607 is normal.

3) Debug a rotary motion table, power on an electric vibration table 12, and control the electric vibration table 12 to output a sinusoidal excitation in a vertical direction; transmit the excitation to a support plate I 10 through a connecting fixture 11 to cause the support plate I 10 to rotate around a horizontal shaft 2; ensure that the support plate I 10 is able to normally rotate around the horizontal shaft 2 and a signal output of an acceleration sensor 9 is normal.

4) Start the drive motor 601 to slowly increase the speed of the gear transmission system 606 to a speed required by an experiment; start the load motor 609, and enable the load motor 609 to load the gear transmission system 606 with a load torque required by the experiment.

5) Power on the electric vibration table 12, and control the electric vibration table 12 to output an excitation required by the experiment, so that a linear motion platform 4 mounted on the support plate I 10 and the gear transmission experiment table 6 rotate together with the support plate I 10 around the horizontal shaft 2.

6) Record a dynamic response of the gear transmission system 606 during the rotation of the support plate I 10.

7) Repeat Steps 4) and 5), adjust the size and type of the excitation output by the electric vibration table 12 through a control system, and record the dynamic response of the gear transmission system 606 under different non-inertial systems of pitching under the same operating condition.

8) Repeat Steps 3), 4), 5) and 6), adjust the speed of the drive motor 601, the load of the load motor 609 and the size and type of the excitation output by the electric vibration table 12 through the control system, and record the dynamic response of the gear transmission system 606 under different non-inertial systems of pitching under different operating conditions.

9) Shut down in accordance with an operating procedure of the experimental equipment.

Embodiment 5

An experimental method using the experimental system described in Embodiment 2 to simulate a non-inertial system for yawing of gear transmission, including the following steps:

1) Connect experimental equipment, and ensure that all parts are connected firmly and a vibration test system is well connected.

2) Debug a gear transmission experiment table 6, power on a drive motor 601, and control a speed of a gear transmission system 606 to slowly increase to a safe speed; power on a load motor 609, and control the gear transmission system 606 to be slowly loaded to a safe load torque; ensure that the gear transmission system 606 is able to rotate normally, and observe whether a signal output of a torque speed sensor I 604 and a torque speed sensor II 607 is normal.

3) Debug a rotary motion table, power on an electric vibration table 12, and control the electric vibration table 12 to output a sinusoidal excitation in a vertical direction, so that a wedge block 1105 moves up and down with the electric vibration table 12, where when the wedge block 1105 moves upward, a push rod 1101 moves horizontally along guides 1106 through a cam 1104, and a support plate I 10 is driven to rotate counterclockwise around a vertical shaft 3 through the push rod 1101; when the wedge block 1105 moves downward, the push rod 1101 moves in an opposite direction along the guides 1106 together with the cam 1104 under the action of springs 1103, and at the same time drives the support plate I 10 to rotate clockwise around the vertical shaft 3; ensure that the support plate I 10 is able to rotate normally around the vertical shaft 3, and observe whether a signal output of an acceleration sensor 9 is normal.

4) Start the drive motor 601 to slowly increase the speed of the gear transmission system 606 to a speed required by an experiment; start the load motor 609, and enable the load motor 609 to load the gear transmission system 606 with a load torque required by the experiment.

5) Power on the electric vibration table 12, and control the electric vibration table 12 to output an excitation required by the experiment, so that a linear motion platform 4 mounted on the support plate I 10 and the gear transmission experiment table 6 rotate together with the support plate I 10 around the vertical shaft 3.

6) Record a dynamic response of the gear transmission system 606 during the rotation of the support plate I 10.

7) Repeat Steps 4) and 5), adjust the size and type of the excitation output by the electric vibration table 12 through a control system, and record the dynamic response of the gear transmission system 606 under different non-inertial systems of yawing under the same operating condition.

8) Repeat Steps 3), 4), 5) and 6), adjust the speed of the drive motor 601, the load of the load motor 609 and the size and type of the excitation output by the electric vibration table 12 through the control system, and record the dynamic response of the gear transmission system 606 under different non-inertial systems of yawing under different operating conditions.

9) Shut down in accordance with an operating procedure of the experimental equipment.

Specific embodiments are used for illustration of the principles and implementations of the present disclosure. The description of the embodiments is only used to help illustrate the method and its core ideas of the present disclosure. In addition, persons of ordinary skill in the art can make various modifications in terms of specific embodiments and scope of application in accordance with the teachings of the present disclosure. In conclusion, the content of this specification should not be construed as a limitation to the present disclosure.

What is claimed is:

1. An experimental system capable of simulating a non-inertial system of gear transmission, comprising a gear transmission experiment table (6), a manual cross slide set (5), a linear motion platform (4) and an electric vibration table (12), wherein
 the gear transmission experiment table (6) comprises a drive motor (601), a motor support I (602), couplings (603), a torque speed sensor I (604), an elastic shaft (605), a gear transmission system (606), a torque speed sensor II (607), a motor support II (608) and a load motor (609);
 the drive motor (601) is mounted on the motor support I (602); the drive motor (601) transmits power to the gear transmission system (606) through two couplings (603), the torque speed sensor I (604) and the elastic shaft (605);
 the load motor (609) is mounted on the motor support II (608); the load motor (609) applies a load torque to the gear transmission system (606) through two couplings (603) and the torque speed sensor II (607); the gear transmission system (606) is located between the drive motor (601) and the load motor (609);
 the manual cross slide set (5) comprises a manual cross slide I (501) and a manual cross slide II (502); the motor support I (602) and the torque speed sensor I (604) are both fixed on the manual cross slide I (501); the torque speed sensor I (604) acquires input and output vibration signals of the drive motor (601) when the drive motor is running, and transmits the signals to a control system; the motor support II (608) and the torque speed sensor II (607) are both fixed on the manual cross slide II (502); the torque speed sensor II (607) acquires input and output vibration signals of the load motor (609) when the load motor is running, and transmits the signals to the control system;
 there is a gap S between the manual cross slide I (501) and the manual cross slide II (502), and the manual cross slide I (501) and the manual cross slide II (502) are both fixed on a support plate III (7); a lower end of the gear transmission system (606) passes through the gap S and is fixed to the support plate III (7);
 a lower surface of the support plate III (7) is connected to the linear motion platform (4); the linear motion platform (4) is provided thereon with a motion measurement system for measuring a position, a speed and an error of the linear motion platform, and the motion measurement system transmits a measurement result to the control system; a lower end of the linear motion platform (4) is connected with a support plate II (8), and the support plate II (8) is fixed on an upper surface of a support plate I (10);
 the support plate I (10) is a rectangular plate; an upper surface of the support plate I (10) is provided with an acceleration sensor (9), and two ends of the support plate I (10) are respectively marked as end A and end B; an upper surface of end A of the support plate I (10) fixes the support plate II (8), and a lower surface of end A of the support plate I (10) connects a vertical shaft (3); a lower end of the vertical shaft (3) is connected with a horizontal shaft (2), and the horizontal shaft (2) is fixed on a rotary table base (1);
 rotation axes of the drive motor (601), the load motor (609) and the horizontal shaft (2) are all parallel to a moving direction of the linear motion platform (4); a connecting line between end A and end B of the support plate I (10) is perpendicular to the rotation axis of the horizontal shaft (2);
 a lower surface of end B of the support plate I (10) is provided with a connecting fixture (11), and the connecting fixture (11) is a rigid connecting rod; a lower end of the connecting fixture (11) is connected with the electric vibration table (12), and the electric vibration table (12) is fixed on a vibration table base (13);
 during operation, the electric vibration table (12) drives the support plate I (10) to rotate around the horizontal shaft (2) through the connecting fixture (11), and the linear motion platform (4) mounted on the support plate I (10) and the gear transmission experiment table (6) rotate together with the support plate I (10) around the horizontal shaft (2).

2. The experimental system capable of simulating a non-inertial system of gear transmission according to claim 1, wherein a transmission mode of the gear transmission system (606) is parallel axis gear transmission or planetary gear transmission.

3. The experimental system capable of simulating a non-inertial system of gear transmission according to claim 1, wherein the linear motion platform (4) comprises guide rails (401), a rotor part (402), a stator part (403), stoppers (404), a sliding carriage (405), a base (406) and a motion measurement system; the base (406) is a rectangular plate fixed on the support plate II (8), and a length direction of the base (406) is the moving direction of the linear motion platform (4);

a side wall of the base (406) along a length direction is provided thereon with a sensor bar (407) of the motion measurement system, and an upper surface of the base (406) is provided with two guide rails (401), the stator part (403) and two stoppers (404); the stator part (403) has a rectangular plate shape; the guide rails (401) and the stator part (403) are arranged along the length direction of the base (406); the stator part (403) is located between the two guide rails (401); a height of the guide rail (401) is smaller than a height of the stator part (403); the two stoppers (404) are respectively located at two ends of the base (406);

the sliding carriage (405) comprises a sliding plate and four sliding rods under the sliding plate; an upper surface of the sliding plate is connected with the support plate III (7), and a lower surface thereof is provided with the rotor part (402); the rotor part (402) is located directly above the stator part (403); lower ends of the four sliding rods are inserted into the two guide rails (401), so that the sliding carriage (405) moves linearly along the guide rails (401) on a horizontal plane; and a sensor (408) of the motion measurement system is provided on a side wall of a sliding rod facing the sensor bar (407); when the sliding carriage (405) moves, the sensor (408) and the sensor bar (407) of the motion measurement system sense each other to measure a position, a speed and an error of the sliding carriage (405).

4. An experimental method using the experimental system according to claim 1 to simulate a non-inertial system for linear acceleration of gear transmission, comprising the following steps:

1) connecting experimental equipment, and ensuring that all parts are connected firmly;
2) debugging a gear transmission experiment table (6) and a linear motion platform (4), and ensuring that the gear transmission experiment table (6) and the linear motion platform (4) are able to operate normally;
3) starting a drive motor (601), and slowly increasing a speed of a gear transmission system (606) to a speed required by an experiment; starting a load motor (609), and enabling the load motor (609) to load the gear transmission system (606) with a load torque required by the experiment;
4) accelerating the linear motion platform (4) to an acceleration required by the experiment, and driving, by the linear motion platform (4), a support plate III (7) and the gear transmission experiment table (6) to make linear acceleration;
5) recording a dynamic response of the gear transmission system (606) during the linear acceleration;
6) repeating steps 4) and 5), adjusting the acceleration of the linear motion platform (4) through a control system, and recording the dynamic response of the gear transmission system (606) under different non-inertial systems of linear acceleration under the same operating condition;
7) repeating steps 3), 4), 5) and 6), adjusting the speed of the drive motor (601), the load of the load motor (609) and the acceleration of the linear motion platform (4) through the control system, and recording the dynamic response of the gear transmission system (606) under different non-inertial systems of linear acceleration under different operating conditions.

5. An experimental method using the experimental system according to claim 1 to simulate a non-inertial system for pitching of gear transmission, comprising the following steps:

1) connecting experimental equipment, and ensuring that all parts are connected firmly;
2) debugging a gear transmission experiment table (6) and an electric vibration table (12), and ensuring that the gear transmission experiment table (6) is able to operate normally and a support plate I (10) rotates normally around a horizontal shaft (2);
3) starting a drive motor (601), and slowly increasing a speed of a gear transmission system (606) to a speed required by an experiment; starting a load motor (609), and enabling the load motor (609) to load the gear transmission system (606) with a load torque required by the experiment;
4) starting the electric vibration table (12), controlling the electric vibration table (12) to output an excitation required by the experiment, so that a linear motion platform (4) mounted on the support plate I (10) and the gear transmission experiment table (6) rotate together with the support plate I (10) around the horizontal shaft (2);
5) recording a dynamic response of the gear transmission system (606) during the rotation of the support plate I (10);
6) repeating steps 4) and 5), adjusting the size and type of the excitation output by the electric vibration table (12) through a control system, and recording the dynamic response of the gear transmission system (606) under different non-inertial systems of pitching under the same operating condition; and
7) repeating steps 3), 4), 5) and 6), adjusting the speed of the drive motor (601), the load of the load motor (609) and the size and type of the excitation output by the electric vibration table (12) through the control system, and recording the dynamic response of the gear transmission system (606) under different non-inertial systems of pitching under different operating conditions.

* * * * *